(12) United States Patent
Dewitt et al.

(10) Patent No.: US 11,138,005 B2
(45) Date of Patent: Oct. 5, 2021

(54) METHODS AND SYSTEMS FOR AUTOMATICALLY GENERATING DOCUMENTATION FOR SOFTWARE

(71) Applicant: Apple Inc., Cupertino, CA (US)

(72) Inventors: Michael M. Dewitt, San Francisco, CA (US); Diogo Manuel Delgado B. Almeida, Santa Clara, CA (US); Emily K. Van Haren, Cupertino, CA (US); Santiago Gonzalez, Austin, TX (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 16/407,008

(22) Filed: May 8, 2019

(65) Prior Publication Data

US 2020/0356363 A1 Nov. 12, 2020

(51) Int. Cl.
  *G06F 8/73* (2018.01)
  *G06F 8/75* (2018.01)
  *G06N 20/00* (2019.01)

(52) U.S. Cl.
  CPC .................. *G06F 8/73* (2013.01); *G06F 8/75* (2013.01); *G06N 20/00* (2019.01)

(58) Field of Classification Search
  CPC .............. G06F 8/73; G06F 8/75; G06N 20/00
  USPC ................................................. 717/110–123
  See application file for complete search history.

(56) References Cited

U.S. PATENT DOCUMENTS

| 6,523,172 B1* | 2/2003 | Martinez-Guerra .... G06F 8/427 704/9 |
| 2007/0094638 A1* | 4/2007 | DeAngelis ................ G06F 8/36 717/107 |
| 2008/0275829 A1* | 11/2008 | Stull ........................ H04L 9/00 706/17 |
| 2011/0066645 A1* | 3/2011 | Cooper ................. G06F 16/313 707/770 |
| 2014/0013304 A1* | 1/2014 | Vangala .................... G06F 8/75 717/123 |
| 2020/0227175 A1* | 7/2020 | Salomon ................ G16H 50/70 |

OTHER PUBLICATIONS

Peters, Dennis K., and David Lorge Parnas. "Using test oracles generated from program documentation." IEEE Transactions on Software Engineering 24.3 (1998): pp. 161-173. (Year: 1998).*

Clarke, Lori A. "A system to generate test data and symbolically execute programs." IEEE Transactions on software engineering 3 (1976): pp. 215-222. (Year: 1976).*

(Continued)

*Primary Examiner* — Satish Rampuria
(74) *Attorney, Agent, or Firm* — Dickinson Wright RLLP

(57) ABSTRACT

This application relates to a system for the automatic generation of software developer documentation. The system utilizes various machine learning algorithms and processes to facilitate at least a portion of the documentation process. Included are steps for extracting metadata from an undocumented symbol's declaration, processing a corpus of previously documented symbols, and generating output for the undocumented symbol. Consequently, a writer is provided with a document that is at least partially completed when the writer begins the process of documenting an undocumented symbol.

20 Claims, 18 Drawing Sheets

(56) References Cited

OTHER PUBLICATIONS

McBurney, Paul W., and Collin McMillan. "Automatic documentation generation via source code summarization of method context." Proceedings of the 22nd International Conference on Program Comprehension. 2014.pp. 279-290 (Year: 2014).*

Van Deursen, Arie, and Tobias Kuipers. "Building documentation generators." Proceedings IEEE International Conference on Software Maintenance—1999 (ICSM'99).'Software Maintenance for Business Change'(Cat. No. 99CB36360). IEEE, 1999.pp. 40-49 (Year: 1999).*

Sridhara, Giriprasad, et al. "Towards automatically generating summary comments for java methods." Proceedings of the IEEE/ACM international conference on Automated software engineering. 2010. pp. 43-52 (Year: 2010).*

Johnson, W. Lewis. "Dynamic (re) generation of software documentation." Proceedings of the Fourth Systems Reengineering Technology Workshop. 1994.pp. 1-11 (Year: 1994).*

Amalfitano, Domenico, Anna Rita Fasolino, and Porfirio Tramontana. "Using dynamic analysis for generating end user documentation for web 2.0 applications." 2011 13th IEEE International Symposium on Web Systems Evolution (WSE). IEEE, 2011. pp. 11-20 (Year: 2011).*

Richner, Tamar, and Stéphane Ducasse. "Recovering high-level views of object-oriented applications from static and dynamic information." Proceedings IEEE International Conference on Software Maintenance—1999 (ICSM'99).'Software Maintenance for Business Change'(Cat. No. 99CB36360). IEEE, 1999.pp. 1-10 (Year: 1999).*

Wiseman et al., "Learning Neural Templates for Text Generation", School of Engineering and Applied Sciences, Harvard University, Cambridge, MA, USA, Sep. 13, 2018, 14 pages.

Weston et al., "Retrieve and Refine: Improved Sequence Generation Models for Dialogue", Facebook AI Research, Proceedings of the 2018 EMNLP Workshop SCAI: The 2nd Int'l Workshop on Search-Oriented Conversational AI, pp. 87-92, Brussels, Belgium, Oct. 31, 2018.

* cited by examiner

```
 1:  // Source Code Example in Swift Programming Language
 2:  //
 3:  // Created 1/1/2019
 4:
 5:
 6:
 7:  class myClass {
 8:
 9:    var variableName: Int = 0
10:
11:    func myFunction (param1: Int, param2: String) -> String {
12:
13:      return "\(param2) is \(param1) years old."
14:
15:    }
16:
17:  }
18:
19:
20:
```

Instance Property 202 underestimatedCount 204

A value less than or equal to the number of elements in the sequence, calculated nondestructively. 206

---

Declaration var underestimatedCount: Int { get }

| Metadata 400 | |
|---|---|
| Declaration 402 | var underestimatedCount: Int { get } |
| Title 404 | underestimatedCount |
| Broken Title 406 | ['underestimated', 'count'] |
| Kind 408 | InstanceProperty |
| Parent Kind 410 | Structure |
| Parameter Names 412 | |
| Parameter Types 414 | |
| Return Type 416 | Int |
| Framework 418 | Swift Standard Library |
| Source code 420 | |

*FIG. 4*

| Metadata 500 | |
|---|---|
| Declaration 402 | func distance(from: Int, to: Int) -> Int |
| Title 404 | distance(from:to:) |
| Broken Title 406 | ['distance'] |
| Kind 408 | InstanceMethod |
| Parent Kind 410 | Structure |
| Parameter Names 412 | ['from', 'to'] |
| Parameter Types 414 | ['Int', 'Int'] |
| Return Type 416 | Int |
| Framework 418 | UIKit |

*FIG. 5*

Candidates

The number of elements in the collection. 902

A value less than or equal to the number of elements in the collection. 904

A value less than or equal to the number of elements in the sequence, calculated non-destructively. 906

The number of elements in the collection. 908

A value less than or equal to the number of elements in the collection. 910

The number of elements in the collection. 912

A value less than or equal to the number of elements in the collection. 914

A value less than or equal to the number of elements in the sequence, calculated non-destructively. 916

The number of elements in the collection. 918

A value less than or equal to the number of elements in the collection. 920

*FIG. 9*

Clustered Candidates

The number of elements in the collection. (x4) 1002

A value less than or equal to the number of elements in the collection. (x4) 1004

A value less than or equal to the number of elements in the sequence, calculated non-destructively. (x2) 1006

*FIG. 10*

Tokenized Candidates

The number of elements in the <token>. (x4) 1102

A value less than or equal to the number of elements in the <token>. (x6) 1104

*FIG. 11*

METHODS AND SYSTEMS FOR AUTOMATICALLY GENERATING DOCUMENTATION FOR SOFTWARE

FIELD

The described embodiments relate generally to technical documentation. More particularly, the present embodiments relate to methods to aid technical writers with automatically generating documentation for symbols included in a software framework that is associated with an established corpus of documentation.

BACKGROUND

Computer programmers are typically tasked with developing software to perform a variety of tasks. The programmers generate source code in a variety of programming languages to create programs that perform the tasks. In some cases, the programmers develop libraries or a software framework that can be utilized in other source code to eliminate the need to recreate functions that could be reused by a variety of programs. Because the source code is reused by other programmers, documentation of that source code is important.

The programmers are typically tasked with developing the documentation for the source code according to a set of technical standards. The documentation for the source code can be compiled from the programmer's knowledge of the structure of the program, from comments included in the source code, and/or inferred directly from the context of the source code.

Documenting new symbols or interfaces included in the programs is a tedious and time consuming process. Furthermore, ensuring that the generated documentation conforms to the set of technical standards may require editors or automated evaluation of the documentation to ensure consistency across the documentation corpus. Therefore, what is desired is a means to automate at least some aspects of the documentation process to improve the quality and coverage of the provided documentation.

SUMMARY

This paper describes embodiments that relate to automatic generation of technical documentation. Various algorithms can be utilized to facilitate at least a portion of the documentation process. Consequently, a writer is provided with a document that is at least partially completed when the writer begins the process of creating a document for an undocumented symbol.

In some embodiments, generating documentation for undocumented symbols includes steps for extracting metadata about symbols, processing an existing corpus of symbol documentation, and generating an output for the undocumented symbol based on learned associations between the metadata and the documented symbols. This technique may be referred to as a structured data to text translation task herein.

In some embodiments, the metadata for a symbol, documented or undocumented, includes one or more fields such as, but not limited to: (1) a first field that specifies a signature of the symbol; (2) a second field that specifies a name of the symbol; (3) a third field that includes a list of words included in the name of the symbol in accordance with a word delineation format (such as camel case); (4) a fourth field that specifies a category for the symbol; (5) a fifth field that specifies a category for a parent programming construct associated with the symbol; (6) a sixth field that includes a list of parameters associated with the symbol; (7) a seventh field that includes a list of types associated with each of the parameters associated with the symbol; (8) an eighth field that specifies a type associated with the return value if the symbol is a function; (9) a ninth field that specifies a software framework associated with the symbol; and/or (10) source code in which the symbol is used. In some embodiments, the metadata is generated automatically, by one or more server devices that may utilize a code compiler, when the source code including the symbol is imported into a content management system.

In some embodiments, the metadata for the undocumented symbol can be utilized to find documented symbols whose content is similar to what a writer would have produced to describe the undocumented symbol. In some embodiments, a machine learning algorithm can be used to derive the association between the undocumented symbol's metadata and the documented symbol metadata, optimizing for documentation that constitutes a useful suggestion. The machine learning algorithm can be a learning-to-rank algorithm that receives a query based on the metadata and produces a ranking of documented symbols ordered according to their learned similarity with the undocumented symbol. Additionally or alternatively, another machine learning algorithm (e.g., a text generation machine learning algorithm) may learn to generate content by utilizing the metadata and written abstracts as supervised training content. For example, after training, the text generation machine learning algorithm may receive input data including metadata of an undocumented symbol and generate output data including a written abstract based on the training content.

In some embodiments, the existing corpus of documented symbols may be normalized by replacing portions of the text with tokens. Tokens are used to make the documentation less specific to any individual symbol and indicate to a writer that the text span should be replaced with custom text. This process can include adding tokens for infrequent terms which are unlikely to be used to describe future undocumented symbols. An unlikely term can be determined using term frequency inverse-document frequency statistics compared to a threshold value. Further normalization can be done by replacing contextual words known to only pertain to the documented symbol, such as the title, parameter names, etc. as indicated by the associated metadata.

In some embodiments, a set of top matching symbols is considered. The tokenized text strings associated with each matching symbol are then compared to extract clusters of text strings with sufficient similarity. The most common clusters can then be reduced down to a single documentation suggestion by analyzing the overlapping substring ranges. These clusters may be used to judge the output (e.g., documentation suggestion) that may be automatically generated by a system using the algorithms described herein, or as an example of similar documentation trading off adaptability for consistency.

In some embodiments, once the documentation suggestion is generated it can be further refined to more similarly match the target undocumented symbol. This process can involve automatically replacing the contextual terms with terms pertaining to the undocumented symbol's metadata. For example, if a term was removed because it was the title of the documented symbol it may be replaced by the title of the target undocumented symbol. Additional replacement analysis can be done based on the part-of speech of the removed and target term, known transitions between different domains of the symbols, and/or other text relevance analysis algorithms.

In some embodiments, the matched text output can be a structured document containing all possible token substitutions and may include more than one such structured document. The document can include markup language that can be interpreted by an application on a client device to display a representation of the document on a display of the client device. A user interface element can enable a user to select a tokenized text string provided in the output as the text string for the undocumented symbol to include in the document. Once selected, additional user interface elements can enable the user to select a substitute text string provided in the output to replace a particular token in the tokenized text string. Alternatively, the user can manually enter text to replace the token. The client application can then store the document for the undocumented symbol in a memory, such as by uploading the document to the documentation corpus in the content management system.

In some embodiments, a system for generating documentation for a software framework is disclosed that includes at least one server device. The at least one server device can be configured to import source code for the software framework into a content management system, parse the source code to identify a declaration for an undocumented symbol in the source code, and generate metadata for the undocumented symbol. The metadata can then be used to identify a set of documented symbols. A text string for the undocumented symbol is then generate based on a text string associated with at least one documented symbol in the set of documented symbols, which can be modified based on the metadata in order to generate the text string for the undocumented symbol.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 1 illustrates source code that includes a declaration for an undocumented symbol, in accordance with some embodiments.

FIG. 2 illustrates a document providing a description of a symbol, in accordance with some embodiments.

FIG. 4 illustrates metadata associated with a symbol for a variable, in accordance with some embodiments.

FIG. 5 illustrates metadata associated with a symbol for a function, in accordance with some embodiments.

FIG. 9 illustrates a set of text strings associated with a group of candidate symbols, in accordance with some embodiments.

FIG. 10 illustrates the set of text strings, reduced via a clustering algorithm, in accordance with some embodiments.

FIG. 11 illustrates a list of normalized candidate text strings that have been reduced via the clustering algorithm, in accordance with some embodiments.

DETAILED DESCRIPTION

Figure 3:
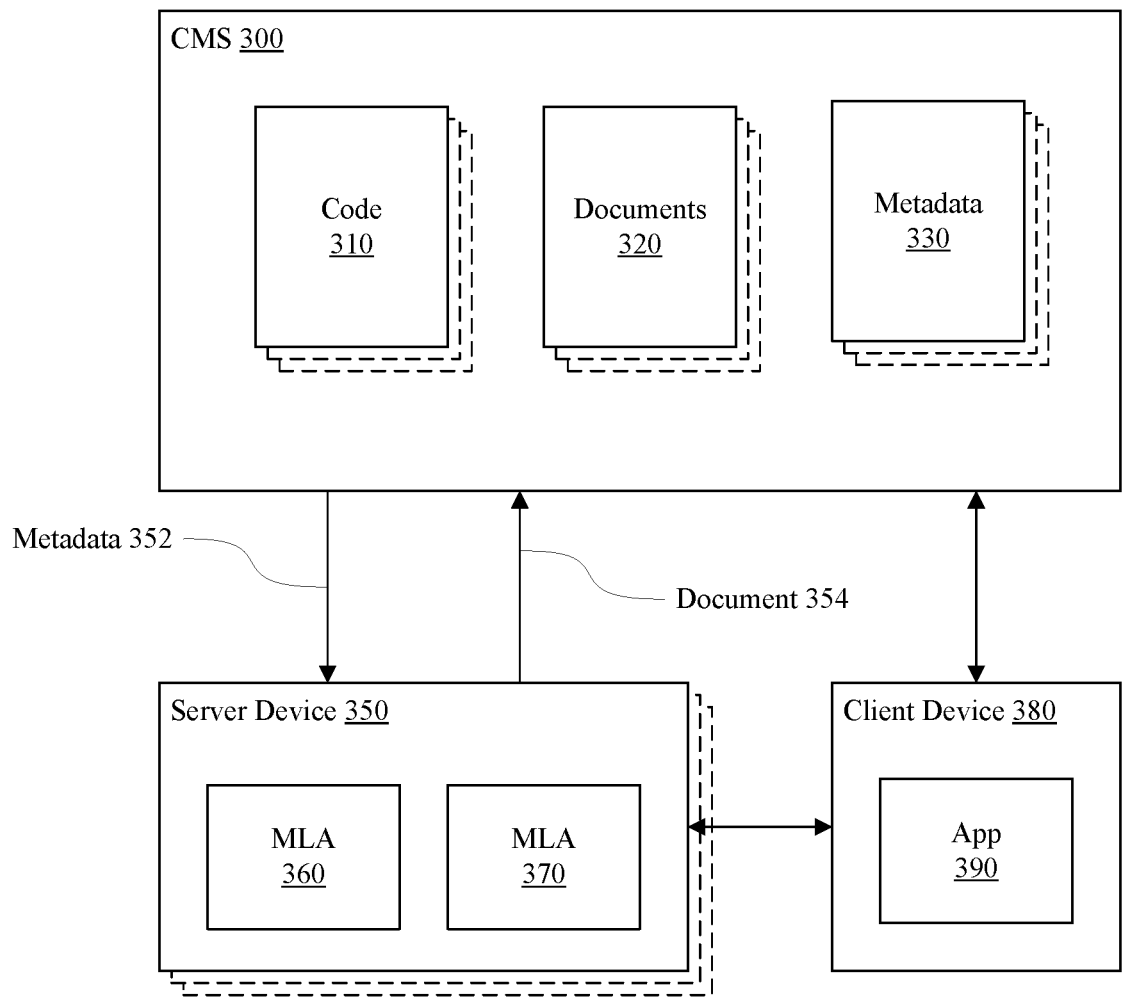
FIG. 3 illustrates a system for generating and maintaining documentation associated with a software framework, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Generating informative and accurate documentation is an important step to producing an effective software framework that can be utilized in various projects by a variety of computer programmers. Conventionally, this task is performed by the programmer or, in some cases, dedicated technical writers that use the programmer's input to generate documentation that conforms to a particular technical standard or style. However, this work can be facilitated in at least some aspects by utilizing automated tools to provide technical writers or other editors with a suggested document that can be edited or modified as seen fit. Providing the technical writer or editor with a partially completed document at the outset of a task rather than a blank document can increase the efficiency of the task and/or improve the quality of the generated documentation.

In various aspects, an existing documentation corpus can be leveraged to automatically generate suggested text for an undocumented symbol. The technical writer or editor can then modify the suggested text to produce a completed document to add to the documentation corpus. Machine learning can be utilized to generate the suggested text for the undocumented symbol.

In some embodiments, a text generation algorithm, such as a language model or sequence to sequence model, may be implemented that generates documentation based on the metadata input sequence. In some embodiments, a retrieval algorithm can be implemented that identifies documented symbols that are similar to the undocumented symbol based on learned metadata associated between the various types of symbols (e.g., documented and/or undocumented). Documented symbols that are similar to the undocumented symbol can be referred to as candidate symbols. The metadata can be generated automatically when source code is imported into a content management system. Alternatively, the metadata can be generated within an integrated development environment (IDE) when the programmer generates the source code.

In some embodiments, a set of text strings associated with candidate symbols can be normalized. A normalization procedure includes inserting tokens into the text strings where the tokens replace words that are identified as infrequently occurring in the documentation corpus. The normalization procedure can also include translating words into other words. Finally, the normalization procedure can include replacing words associated with a documented symbol with different words associated with an undocumented symbol. In some embodiments, the normalization process can be implemented, at least in part, using a machine learning algorithm or, alternatively, by performing a text relevance analysis including a part-of-speech analysis.

In some embodiments, a machine learning algorithm can be implemented to select a top candidate text string from a set of generated or retrieved normalized text strings. The machine learning algorithm can be a clustering algorithm, such as K-means clustering or the like. The clustering algorithm generates a vector for each of the normalized text strings and then utilizes the vectors to group the documented symbols associated with each normalized text string. The top candidate text string can be identified based on, at least in part, a number of documented symbols associated with a particular cluster.

The top candidate text string can be included in an output and transmitted to a client application for further manual editing. The client application can enable a technical writer or editor to view the automatically generated information that describes an undocumented symbol and make any adjustments to the text string as needed. In some embodiments, the top candidate text string includes one or more tokens inserted into the text string during the normalization process. The output can also include one or more substitute text strings that represent suggestions for text to insert in place of a corresponding token. The substitute text strings can comprise portions of a text string replaced with a token during the normalization process.

These and other embodiments are discussed below with reference to FIGS. 1-14; however, those skilled in the art will readily appreciate that the detailed description given herein with respect to these figures is for explanatory purposes only and should not be construed as limiting.

FIG. 1 illustrates source code 100 that includes a declaration for an undocumented symbol, in accordance with some embodiments. The source code 100 is written in a high level programming language. In some embodiments, the programming language is the Swift programming language.

In other embodiments, the programming language can be a different language such as Objective-C, Java, Python, C++, Ruby, or the like. Of course, in other embodiments, the programming language can be a low level language such as assembly language. Any programming language that includes declarations of symbols is within the scope of the present detailed description.

As depicted in FIG. 1, the source code 100 is a file or other data structure including information, such as an ASCII or Unicode text string, character array, or the like. In some embodiments, the file includes text structured according to a particular programming language. The source code 100 can include various statements (e.g., lines of text), which can define classes, functions, variables, constants, or even preprocessor directives or comments. Each programming language can be associated with a syntax that defines the various statements that are compatible with a compiler for the programming language.

The source code 100 depicted in FIG. 1 includes declarations for various symbols, including a declaration for a class, represented by the symbol 'myClass', a declaration for a variable, represented by a symbol 'variableName', and a declaration for a function, represented by a symbol 'myFunction'. Symbols can be declared with various access control parameters. For example, variables in Swift can be modified by the keywords open, public, internal, fileprivate, or private to define a scope of the variable. Symbols declared with the open or public modifiers could be accessed outside of the scope of the source code 100 file and, therefore, documentation on what these symbols represent can be helpful to other programmers that are importing the source code into their programs.

FIG. 2 illustrates a document 200 providing a description of a symbol, in accordance with some embodiments. The document 200 includes information related to and providing context for a symbol included in source code. The symbol can be associated with a software framework that is provided to software developers to generate software based on the software framework. Examples of various types of software frameworks include an application framework (e.g., a framework utilized to develop applications for a particular operating system or target environment), a graphics framework (e.g., a framework utilized to implement graphics within an application and/or interface with graphics hardware), a service framework (e.g., a framework utilized to interface with a service accessible on a device or via a network), a media framework (e.g., a framework utilized to provide multi-media functionality to an application), or a system framework (e.g., a framework utilized to add various functionality to an application such as Bluetooth connectivity, security, or networking). It will be appreciated that the documentation developed by a software developer can include documents for one or more software frameworks. In addition, the types of software frameworks listed above is not intended to be limiting as other types of software frameworks can be developed for various purposes.

In some embodiments, the document 200 can be included in a set of documents that makes up a documentation corpus for a collection of code corresponding to one or more software frameworks. As depicted in FIG. 2, the symbol underestimatedCount represents a variable of type Integer. The document 200 can be a file, structured document (e.g., XML, HTML, etc.), or any other type of data structure including information related to the symbol. In some embodiments, the document 200 is a structured document that includes a number of sections that include mark-up language as well as text that provides various information related to the symbol.

As depicted in FIG. 2, the document 200 includes a first portion 202 that identifies a category for the programming construct represented by the symbol (e.g., InstanceProperty, InstanceMethod, TypeMethod, GlobalVariable, TypeProperty, or Function). The documentation 200 also includes a second portion 204 that identifies the name of the symbol, a third portion 206 that identifies a description of the symbol, and a fourth portion 208 that includes a signature for the declaration of the symbol in the source code.

It will be appreciated that the document 200 shown in FIG. 2 is merely one example of a structure for documents included in the documentation corpus. The documents can include additional portions that include additional information related to the symbol. For example, additional portions can include a list of related symbols, links to other symbols within the same scope of the symbol (e.g., the same framework, file, etc.), or example source code or images that illustrate the use of the symbol within the software framework. Other types or structures of the documents are contemplated as within the scope of the present description. For example, the document 200 can be a file of a particular format such as a portable document format (pdf). The document 200 may be read-only or not easily modified when displayed to a user using a client application.

FIG. 3 illustrates a system for generating and maintaining documentation associated with a software framework, in accordance with some embodiments. The system includes a repository for storing source code 310, a set of documents 320 associated with the source code, and metadata 330. In some embodiments, the repository is implemented as a content management system 300 and includes one or more nodes for storing and accessing the code 310, documents 320, and/or metadata 330 via a network. Each node can comprise a server device, which may or may not include storage media such as a hard disk, solid state drive, disk array, or other type of non-volatile memory resource. In some embodiments, the CMS 300 incorporates, or interfaces with, a distributed storage platform implemented on a number of server devices and accessible over a network as well as one or more front end servers that provide an interface to the data stored on the distributed storage platform by one or more additional server devices 350 and/or client device 380.

In some embodiments, the set of documents 320 represent a documentation corpus maintained by a software developer. Each document in the set of documents 320 can be related to a specific symbol included in the source code 310, e.g., such as document 200 of FIG. 2. It will be appreciated that, in other embodiments, the set of documents 320 can be stored in a separate system that is distinct from the CMS 300 used to maintain the source code, libraries, or other software resources associated with the one or more software frameworks. For example, the set of documents 320 can be maintained on one or more servers external to the CMS 300 that are implemented as a web server for distributing the documentation via a web portal. In other words, the CMS 300 can maintain software and libraries developed by a software developer and distributed to third party developers via a network while the documentation for such software is maintained in a separate system associated with a webpage maintained by the software developer.

As depicted in FIG. 3, one or more server devices 350 can be configured to receive metadata related to an undocumented symbol. As used herein, the term "undocumented symbol" refers to a symbol for a software construct included in the source code 310 for which there is no corresponding document 200 within the set of documents 320. Furthermore, as used herein, the term "documented symbol" refers to a symbol for a software construct included in the source code 310 for which there is a corresponding document 200 within the set of documents 320.

In addition, each symbol, documented or undocumented, is associated with metadata 330 that includes information related to the symbol. The metadata 330 for a symbol can be generated automatically as source code 310 including that symbol is imported into the CMS 300. In some embodiments, a file containing source code for a particular software framework is imported into the CMS 300. A process, implemented by at least one server device, can parse the source code to identify symbols included in the source code. For each undocumented symbol found in the source code, the process can generate a data structure that contains metadata for the symbol. The metadata can include information determined from the context provided by the source code as well as information determined as part of the import process. For example, while importing the source code into the CMS 300, a software developer can be prompted to specify a software framework associated with the source code. The software developer can also be prompted for additional information related to the source code during the import process. Alternatively, this information can be identified by the IDE used to generate and/or import the source code into the CMS or based on import parameters set during the import process.

In some embodiments, one or more server devices 350 can be configured to generate, automatically, a document 200 corresponding to any undocumented symbols identified in source code. The document generation process can be completely or partially automated. For example, while importing a particular file containing source code into the CMS 300, a task can be transmitted to the one or more server devices 350 for each undocumented symbol identified within the source code. The task can include metadata 352 corresponding to the undocumented symbol. The task can cause the one or more server devices 350 to generate a document 354 corresponding to the undocumented symbol and store the document 354 in the set of documents 320 in the CMS 300. The document 354 can later be edited by a technical writer using a client application 390 on a client device 380 to make any changes to the automatically generated document. Alternatively, in other embodiments, a technical writer could manually launch a client application 390 that queries the one or more servers 350 to detect any undocumented symbols included in source code 310 uploaded into the CMS 300. The technical writer could generate the document 354 using the client application 390, utilizing suggestions provided by the one or more servers 350 to complete the document 354, which is then uploaded into the CMS 300.

In some embodiments, the one or more server devices 350 implement machine learning algorithms in a manner than helps facilitate suggested content to include in the document 354. As will be discussed in more detail below, a first machine learning algorithm 360 can be utilized to identify documented symbols that are similar to the undocumented symbol based on the metadata 352 for the undocumented symbol. Furthermore, a second machine learning algorithm 370 can be utilized to evaluate text strings associated with a set of candidate symbols in order to provide suggested content to include in the document 354 for the undocumented symbol.

FIG. 4 illustrates metadata 400 associated with a symbol for a variable, in accordance with some embodiments. The metadata 400 is a data structure that includes information related to a symbol. In some embodiments, each symbol is associated with a file that includes the metadata for the symbol. In other embodiments, metadata for a number of symbols is stored in a structured database, key-value store, or other construct or data structure for storing information in a memory of one or more devices.

As depicted in FIG. 4, the metadata 400 includes a number of fields, each field associated with a value corresponding to that field for the particular symbol associated with the metadata 400. The fields shown in FIG. 4 are for illustrative purposes and should not be construed as limiting. Additional fields can be included in addition to or in lieu of the fields shown in FIG. 4.

In some embodiments, the metadata 400 includes a declaration field 402 that specifies a signature of the symbol. The signature can be a string that matches a declaration of the symbol included in the source code. In some embodiments, the line of the source code where the symbol is declared can be modified (e.g., to remove an initial value, to remove parameter names from a function declaration thereby leaving only parameter types in the signature for the symbol, etc.) to generate the signature.

The metadata 400 can also include a title field 404 that specifies a name of the symbol. The name can be parsed from the signature for the symbol omitting any types, modifiers, parameters, or the like included in the declaration, in accordance with the syntax for a particular programming language.

The metadata 400 can also include a broken title field 406 that includes a list of words included in the name of the symbol in accordance with a camel case format. It will be appreciated, that where camel case format is not utilized within the source code, the words from the title can be identified by other methods, such as identifying words separated by a special character like an underscore ('_'). In some cases, the name can start with a prefix that is a character or set of characters that identify a type for the symbol (e.g., 'b' or 'bool' for Boolean, 'i' or 'int' for Integer, etc.). Such prefixes can be discarded and not included in the broken title field 406.

The metadata 400 can also include a kind field 408 that specifies a category for the symbol. Again, examples of possible categories include InstanceProperty, InstanceMethod, TypeMethod, GlobalVariable, TypeProperty, or Function. Alternative categories could include: Variable, Class, Property, Structure, or other descriptive terms for a particular class of programming construct.

The metadata 400 can also include a parent kind field 410 that specifies a category for a parent programming construct associated with the symbol. The parent programming construct can refer to a class that includes properties or methods inherited by a class for the programming construct of the symbol. It will be appreciated that a category is not strictly limited to class types in an object-oriented programming language but could instead refer to a categorical hierarchy explicitly associated with various programming constructs. For example, a numbers category could be a parent of integer, float, and fixed point child categories.

The metadata 400 can also include a parameter names field 412 that includes a list of parameters associated with the symbol. The parameter names field 412 can be empty unless the symbol refers to the name of a function and the function declaration includes at least one parameter. The metadata 400 can also include a parameter types field 414 that includes a list of types associated with each of the parameters associated with the symbol.

The metadata 400 can also include a return type field 416 that specifies a return type associated with the symbol. The type can be different than the category of the kind field 408. For example, a type can specify a return type of the function referred to by the symbol. The type can also specify the particular type of value referenced by the symbol, which may be more specific than the category for the programming construct of the variable.

The metadata 400 can also include a framework field 418 that specifies a software framework (e.g., "Swift Standard Library") associated with the symbol. The software framework correlates various symbols under a particular umbrella framework. In addition, different software frameworks could include declarations for symbols that are the same in both frameworks. Consequently, the software framework field can differentiate between similar symbols in different software frameworks. The metadata 400 can also include a source code field 420 that specifies the source code in which the symbol is used.

FIG. 5 illustrates metadata 500 associated with a symbol for a function, in accordance with some embodiments. The metadata 500 includes the same fields as the metadata 400. However, the values stored in the fields can be different for a function than for a variable. For example, the declaration field 402 for a function includes parameters for the function. In addition, the parameter names field 412 and the parameter types field 414 are not empty where the function declaration includes at least one parameter. In other embodiments, metadata for a function can be different than the metadata for a variable, class, or other type of construct (e.g., the metadata can contain different fields stored in a different format).

Figure 6A:
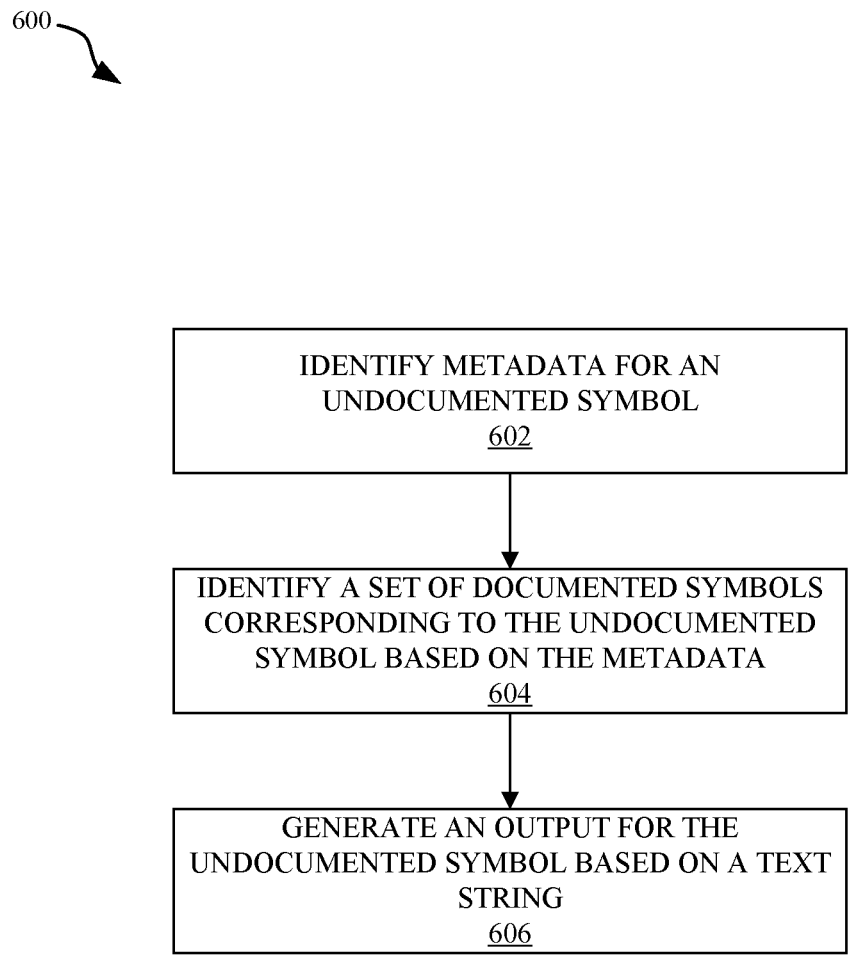
FIG. 6A illustrates a method for generating an output for an undocumented symbol by identifying documented symbols corresponding to an undocumented symbol, in accordance with some embodiments.

FIG. 6A illustrates a method 600 for generating an output for an undocumented symbol by identifying documented symbols corresponding to the undocumented symbol, in accordance with some embodiments. The method 600 can be performed, at least in part, by one or more servers configured to execute instructions that cause a processor to implement the steps of the method. Although the steps are described as being performed by software, in other embodiments, any individual step can be performed by hardware, software, or a combination of hardware and software.

At 602, metadata associated with an undocumented symbol is identified. In some embodiments, source code imported into a CMS 300 is parsed to detect symbols included in the source code. For each of the identified symbols, a documentation corpus can be queried to determine if a document exists for the symbols. If a document for the symbol does not exist in the documentation corpus, then the symbol is characterized as an undocumented symbol and metadata for the symbol is generated based on the context of the undocumented symbol surrounding the import process. For example, the source code and/or import parameters associated with the CMS 300 can provide information that is used to fill in fields included in the metadata for the symbol. For example, a declaration, title, type, category, etc. for the symbol can be parsed directly from the source code; a parent type, framework, etc. can be looked up from related files associated with a particular software framework or project; information can be prompted from a software developer; and so forth.

At 604, a set of documented symbols is identified that correspond to the undocumented symbol based on the metadata. In some embodiments, identifying the set of documented symbols that correspond to the undocumented symbol may be performed during processing of a corpus of symbol documentation. The set of documented symbols can be referred to as candidate symbols. The metadata can be used to query the documentation corpus to return a set of documents that are most relevant to the search query. The n most relevant documents are selected from the results and the documented symbols associated with the relevant documents are selected as candidate symbols that are potentially similar to the undocumented symbol.

In some embodiments, a machine learning algorithm can be used to select a set of candidate symbols that represents a subset of documented symbols included in the documentation corpus. In some embodiments, the machine learning algorithm can be referred to as a retrieval algorithm or an information retrieval algorithm. In some embodiments, the retrieval algorithm is implemented as a retrieval algorithm. The number of documents selected can be manually set to a particular number such as 10-25 documents to provide the most relevant results to the query. Alternatively, the ranked list of documents can be analyzed to generate a metric associated with each document and then documents from the results having a metric value above a threshold value can be selected as the most relevant results.

At 606, an output for the undocumented symbol is generated based on a text string associated with at least one documented symbol in the set of documented symbols. Each document associated with a particular documented symbol includes an abstract or a text string that describes the documented symbol. In practice, the string of text includes one or more sentences that provides a short description of the documented symbol. In some embodiments, the output comprises one or more text strings associated with candidate symbols. Each text string can be modified or normalized to include tokens that represent placeholders to alternative text. The output can also include substitute text strings as suggestions for the alternative text for the tokens.

For example, a text relevance analysis of the text string for a documented symbol can be performed using term frequency-inverse document frequency (TFIDF) statistics to identify words in the text string that are relatively obscure over the entire documentation corpus. Words or phrases that include the infrequent words can be replaced with a token. Similarly, words in the text string that match words in the name of the documented symbol can be replaced with a special type of token referred to as a title token. A title token represents a word that may need to be replaced or translated to a similar word from the title of the undocumented symbol.

In some embodiments, a tokenized text string is selected corresponding to a top ranked candidate symbol from the set of candidate symbols. The tokenized text string can be modified by replacing one or more tokens with replacement strings. In the case of a title token, a replacement string can comprise one or more words from the title of the undocumented symbol as read from the metadata for the undocumented symbol. In the case of a regular token, a replacement string can comprise a suggested string of text from one of the documents for candidate symbols in the set of candidate symbols. In some embodiments, the output for the undocumented symbol includes the tokenized text string for a top candidate symbol as well as one or more substitute text strings that represent suggestions of text that can be selected by a user to replace a particular token in the tokenized text string.

Figure 6B:
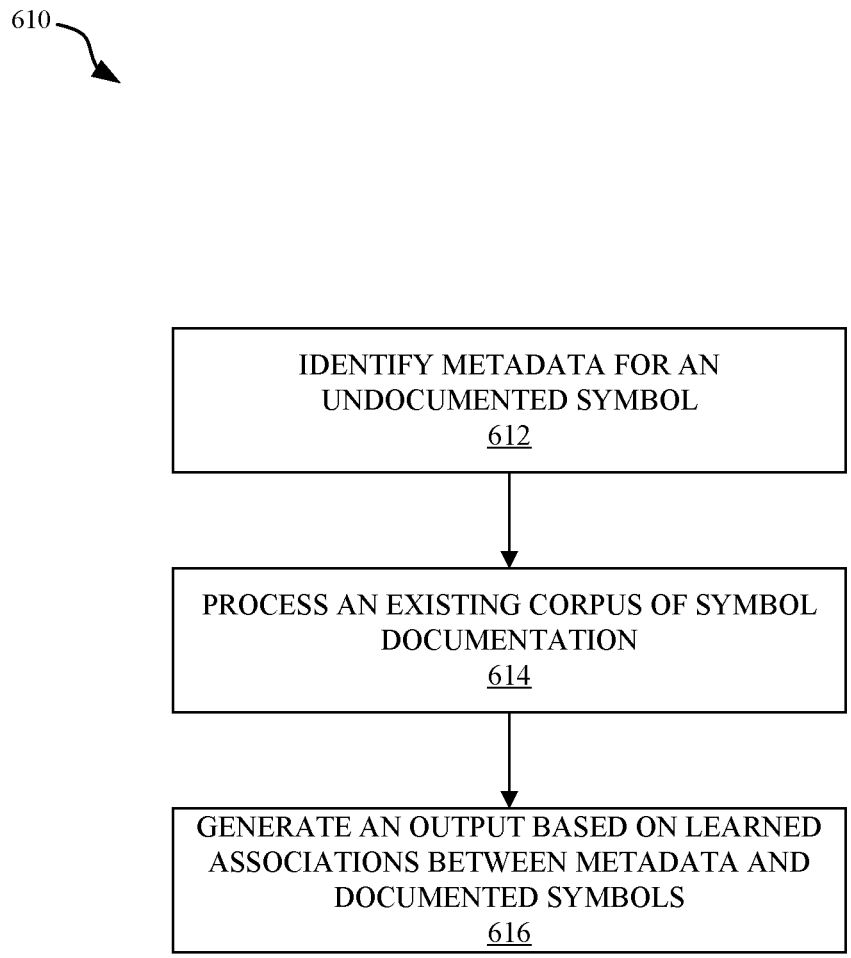
FIG. 6B illustrates a method for generating an output for an undocumented symbol based on learned associations between metadata and documented symbols, in accordance with some embodiments.

FIG. 6B illustrates a method 610 for generating an output for an undocumented symbol based on learned associations between metadata and documented symbols, in accordance with some embodiments. The method 610 can be performed, at least in part, by one or more servers configured to execute instructions that cause a processor to implement the steps of the method. Although the steps are described as being performed by software, in other embodiments, any individual step can be performed by hardware, software, or a combination of hardware and software.

At 612, metadata associated with an undocumented symbol is identified. In some embodiments, source code imported into the CMS 300 is parsed to detect symbols included in the source code. For each of the identified symbols, a documentation corpus can be queried to determine if a document exists for the symbols. If a document for the symbol does not exist in the documentation corpus, then the symbol is characterized as an undocumented symbol and metadata for the symbol is generated based on the context of the undocumented symbol surrounding the import process. For example, the source code and/or import parameters associated with the CMS 300 can provide information that is used to fill in fields included in the metadata for the symbol. For example, a declaration, title, type, category, etc. for the symbol can be parsed directly from the source code; a parent type, framework, etc. can be looked up from related files associated with a particular software framework or project; information can be prompted from a software developer; and so forth.

At 614, an existing corpus of symbol documentation may be processed. For example, a machine learning algorithm (e.g., model) may be trained on training data including a corpus of documentation for symbols and metadata pertaining to the documented symbols. In some embodiments, the machine learning algorithm may learn associations between the metadata of the documented symbols and the documentation of the documented symbols. For example, certain metadata, such as declaration fields, title fields, kind fields, parameter names fields, etc. may be learned to be associated with certain documentation, such as abstracts or text strings that describe the symbols. Processing the existing corpus of symbol documentation may include identifying a set of documented symbols by comparing metadata for the set of documented symbols with the metadata for the undocumented symbol.

In some embodiments, during processing of the existing corpus of symbol documentation, documentation of the documented symbols can be modified or normalized to include tokens that represent placeholders to alternative text. The output of the retrieval algorithm can also include substitute text strings as suggestions for the alternative text for the tokens. The text generating algorithm may be further trained based on the normalized text, which may enhance the accuracy and consistency of output generated by the text generating algorithm.

As described above, a text relevance analysis of the text string for a documented symbol can be performed using term frequency-inverse document frequency (TFIDF) statistics to identify words in the output of the retrieval algorithm that are relatively obscure over the entire documentation corpus. Words or phrases that include the infrequent words can be replaced with a token. Similarly, words in the output of the retrieval algorithm that match words in the name of the documented symbol can be replaced with a special type of token referred to as a title token. The tokenized output can be modified by replacing one or more tokens with replacement strings. In the case of a title token, a replacement string can include one or more words from the title of the undocumented symbol as read from the metadata for the undocumented symbol. In the case of a regular token, a replacement string can include a suggested string of text from the corpus of documented symbols based on the learned associations between metadata and the documented symbols.

At 616, an output (e.g., one or more text strings) is generated based on learned associations between metadata and documented symbols. For example, the metadata associated with the undocumented symbol may be input to the machine learning algorithm that is trained to generate the output by matching documented symbol metadata of the documented symbols with the undocumented symbol metadata and generating the output based on documentation of the documented symbol corresponding to the matching documented symbol metadata. In other words, the output may be generated for the undocumented symbol based on learned associations between the metadata of the documented symbols and the documentation of the document symbols. Accordingly, step 614 may be referred to as a structured data to text translation task by translating metadata of the undocumented symbol into a text string. The machine learning algorithm that performs step 614 may be referred to as a text generating algorithm herein.

In some embodiments, the output that is generated may include one or more sentences that provides a short description of the undocumented symbol. In some embodiments, the output may include normalized text strings due to the text generating algorithm being trained on output from the retrieval algorithm that were normalized. In some embodiments, the output may not include normalized text strings when the text generating algorithm is not trained on out from the retrieval algorithm. In such instances, the output from the text generating algorithm may be normalized, as described above.

In some embodiments, the text generating algorithm and the retrieval algorithm may be used in combination to verify output. For example, the output generated by the text generating algorithm may be compared with output of the retrieval algorithm to verify whether the output is accurate and/or consistent. That is one or more text strings generated by the text generating algorithm may be compared with one or more candidate text string that have a metric value above a threshold value. In one example, the output generated by the text generating algorithm may be compared with a top candidate text string output by the retrieval algorithm. The comparison of outputs of the text generating algorithm and the retrieval algorithm may be performed in reverse order. For example, the output generated by the retrieval algorithm may be compared with the output generated by the text generating algorithm to determine whether the retrieval algorithm is producing accurate and/or consistent output.

Figure 7:
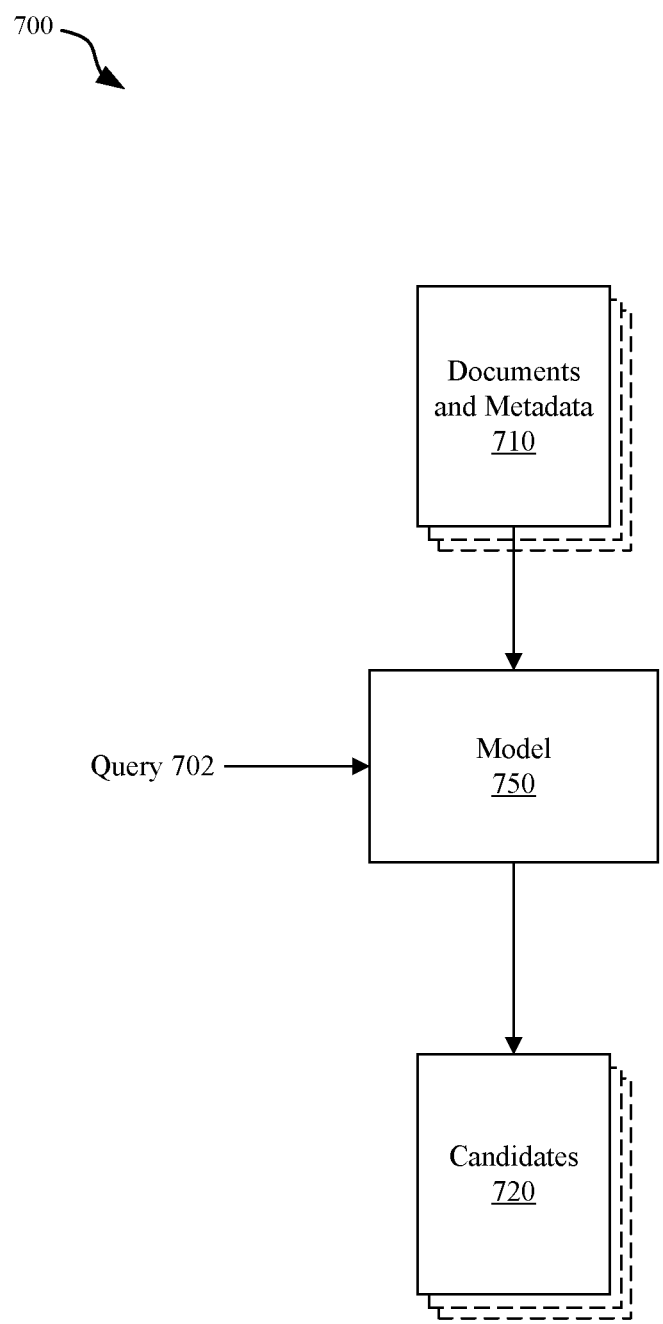
FIG. 7 illustrates a machine learning algorithm configured to generate a set of documented symbols corresponding with an undocumented symbol, in accordance with some embodiments.

FIG. 7 illustrates a machine learning algorithm 700 configured to generate a set of documented symbols corresponding with an undocumented symbol, in accordance with some embodiments. The machine learning algorithm 700 receives a query 702 based on the metadata associated with the undocumented symbol as input and generates a set of candidate symbols 720 that are similar to the undocumented symbol associated with the metadata. Each of the candidate symbols is a documented symbol, which refers to a symbol that is associated with existing documentation in the documentation corpus.

In some embodiments, the machine learning algorithm 700 is a retrieval algorithm. The query 702 includes at least a portion of the metadata for the undocumented symbol. The query 702 is applied to the documentation corpus by the model 750 to derive a feature vector corresponding to each document and metadata 710 in the documentation corpus. A feature vector refers to a vector of values that represent a result of applying a specific query to a corresponding document. For example, a feature vector can include a value that indicates whether a category of the undocumented symbol matches a category of the documented symbol for that particular document. This can be performed by comparing the value for the kind field 408 in the metadata for the undocumented symbol with a value for the kind field 408 in the metadata for the documented symbol that corresponds to the particular document. Other values can also be included in the feature vector, such as a value that indicates whether a particular word in the title field 404 for the undocumented symbol is found in the particular document, a frequency that the word appears in the document relative to other words in the particular document, or so forth. The model 750 defines the algorithm for generating a feature vector based on the fields included in the query 702. In practice, the model 750 can define a large number of features of a document and metadata 710, based on the query 702.

The model 750 also orders the documents and metadata 710 in the documentation corpus based on the results of the feature vector to generate an ordered list of documents in order to identify the candidate symbols 720. In some embodiments, the retrieval algorithm is a supervised learning model such that a training set is used to correlate certain queries with a resulting order of the documents. In other words, the training set is utilized to derive weights for mapping the feature vectors to a rank for the group of documents. The training set can be created by calculating a string similarity between symbols with existing documentation. The string similarity can be automatically calculated using minimum edit distance, or n-Gram based scores like bilingual evaluation understudy (BLEU). As such, this may be modeled as a pairing task by associating metadata between symbols who have a high similarity score, or as a regression task to predict the similarity between any two symbols. The training set can be utilized to adjust the weights associated with processing of the feature vector to adjust the order of the documents, which affects the set of candidate symbols 720 identified by the model 750 in response to a given query 702.

Although the model 750 is described as a retrieval algorithm, it will be appreciated that the machine learning algorithm can take other forms such as a classification algorithm, where the classifications are utilized to derive the set of candidate symbols 720. In other embodiments, the machine learning algorithm could be unsupervised rather than supervised. In yet other embodiments, the model 750 does not implement a machine learning algorithm. Instead, a classic ranking algorithm, such as based on a text relevance analysis, can be used to rank the documents to generate the set of candidate documents.

In some embodiments, the model 750 is a text generation model, such as a language model or a sequence to sequence model. The model 750 may be trained such that it generates documentation based on the metadata input sequence of an undocumented symbol. For example, the model 750 may be a supervised learning model such that a training set (e.g., documents and metadata 710) including a corpus of symbol documentation is used to correlate associations between the metadata and documented symbols. The model 750 may generate output including documentation for an undocumented symbol based on the learned associations between the metadata and the documented symbols.

Figure 8:
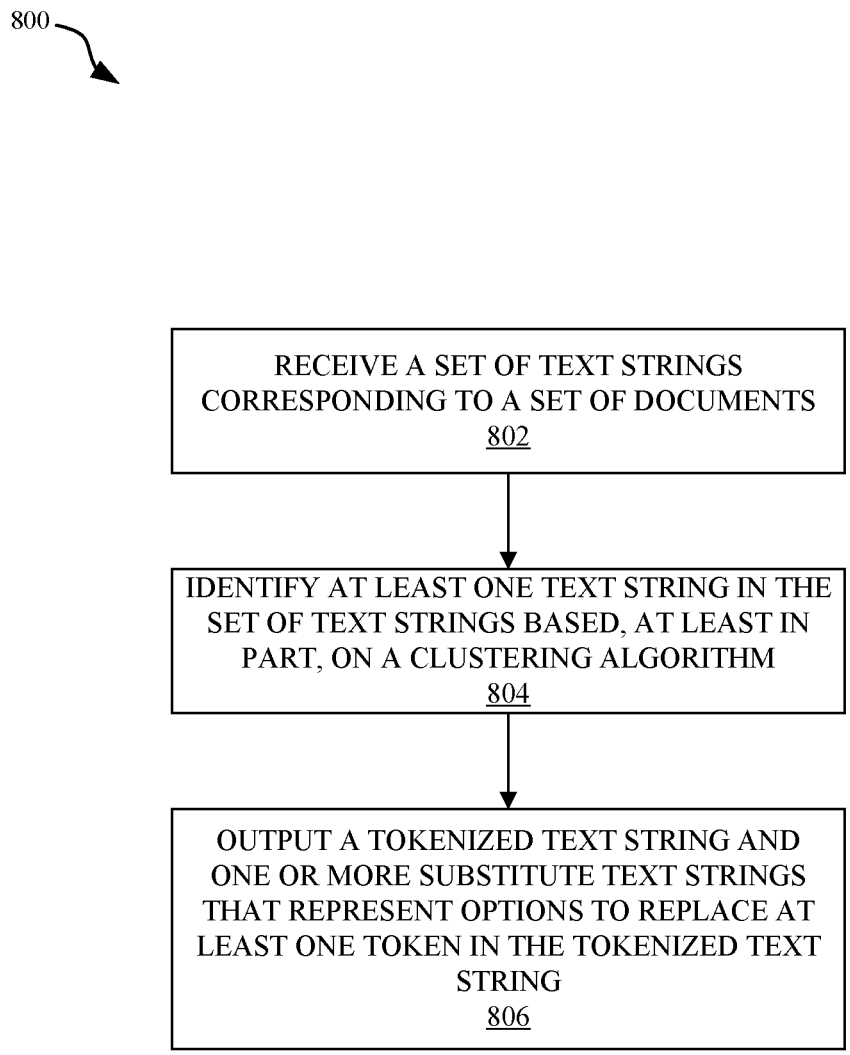
FIG. 8 illustrates a method for generating an output for an undocumented symbol, in accordance with some embodiments.

FIG. 8 illustrates a method 800 for generating an output for an undocumented symbol, in accordance with some embodiments. The method 800 can be performed, at least in part, by one or more servers configured to execute instructions that cause a processor to implement the steps of the method. Although the steps are described as being performed by software, in other embodiments, any individual step can be performed by hardware, software, or a combination of hardware and software.

At 802, a set of text strings are received that correspond to a set of documents. In some embodiments, each document in the documentation corpus includes an abstract for a symbol that includes one or more sentences. In a simple implementation, each document includes a single sentence as the abstract that describes the symbol associated with the document. In some embodiments, a set of candidate symbols are identified as similar to an undocumented symbol. Each of the candidate symbols is associated with a document that includes a text string that can be read from the document, thereby providing the set of text strings.

At 804, at least one text string in the set of text strings is identified based, at least in part, on a clustering algorithm. In some embodiments, the set of text strings associated with the candidate symbols are processed by a machine-learning algorithm to group similar text strings. The set of text strings can be analyzed, according to the clustering algorithm to identify one or more top candidate text strings. For example, the results of the clustering algorithm can be analyzed to determine which cluster includes a highest number of text strings grouped into that cluster. The text strings in that cluster are identified as the at least one text string.

In some embodiments, the text strings are normalized prior to being processed by the clustering algorithm. During a normalization process, each text string is analyzed to identify words in the text string having a low frequency of occurrence in the documentation corpus. Certain words or groups of words that are identified as relatively rare in the documentation corpus can be replaced by a token that acts as a placeholder for other more relevant words to be inserted into the text string. Likewise, words found in the metadata for the documented symbol associated with that text string can be replaced with a title token indicating that the word or group of words in that text string are likely specific to the documented symbol and have a higher probability of being replaced by a corresponding word found in the metadata for the undocumented symbol.

In some embodiments, the text strings are received at 802 having already been normalized. In other embodiments, the clustering algorithms generates clusters prior to normalization, and then the top candidate text string(s) are normalized after being identified.

At 806, an output is generated that includes at least one tokenized text string and one or more substitute text strings that represent options to replace each token in the at least one tokenized text string. In some embodiments, each token represents a portion of a text string removed from one or more text strings in the set of candidate text strings during the normalization process. The word or group of words removed from a text string and replaced with a token can be stored in a list as a substitute text string. A set of substitute text strings can be generated for each token included in the tokenized text string.

In some embodiments, the output is provided to a client application, such as a document editor, browser application, or an IDE. The client application can enable a user to view the tokenized text string and select substitute text strings as a replacement for the one or more tokens included in the tokenized text string. The client application can also enable a user to write custom text to insert into the tokenized text string. The client application can then output, to the CMS or other storage location, a document for the undocumented symbol, which includes the text string edited within the client application.

FIG. 9 illustrates a set of text strings associated with a group of candidate symbols, in accordance with some embodiments. Again, the set of text strings can be read, parsed, or otherwise selected from a set of documents corresponding to documented symbols that are similar to an undocumented symbol. In some embodiments, the set of text strings is derived from an output of a retrieval algorithm.

Each text string in the set of text strings is associated with a different documented symbol from the documentation corpus. It will be appreciated that the same text string may be associated with two or more different documented symbols as implemented in different software frameworks, different methods of the same software framework, and so forth. Also, the set of text strings can include multiple distinct text strings.

As depicted in FIG. 9, the text strings associated with the undocumented symbol "underestimatedCount" includes three distinct text strings including: (1) "[t]he number of elements in the collection" as text strings 902, 908, 912, and 918; (2) "[a] value less than or equal to the number of elements in the collection" as text strings 904, 910, 914, and 920; and (3) "[a] value less than or equal to the number of elements in the sequence, calculated non-destructively" as text strings 906 and 916. These text strings are provided for illustrative purposes and should not be construed as limiting.

FIG. 10 illustrates the set of text strings, reduced via a clustering algorithm, in accordance with some embodiments. It will be appreciated that the set of text strings associated with the group of candidate symbols only included three distinct text strings. Consequently, a clustering algorithm can reduce the set of text strings to a single text string per cluster. As depicted in FIG. 10, the reduced set of clustered text strings includes: (1) "[t]he number of elements in the collection" as text string 1002; (2) "[a] value less than or equal to the number of elements in the collection" as text string 1004; and (3) "[a] value less than or equal to the number of elements in the sequence, calculated non-destructively" as text strings 1006. Each cluster can be associated with a count that indicates the number of text strings for distinct documented symbols that are grouped within that cluster.

In some embodiments, a top candidate text string is selected as an output based on the clustering algorithm. For example, the clustering algorithm can associate a count of the number of text strings included in each cluster with each of the distinct text strings. As depicted in FIG. 10, text string 1002 and text string 1004 each occur four times in the set of text strings associated with candidate symbols. Consequently, one of these two text strings may be selected as the top candidate text string. In cases where two or more clusters include the same number of text strings in each cluster, then a tie breaking mechanism can be employed such as selecting the text string of shortest length, selecting the text string having the most frequently occurring words in the documentation corpus, or by any other technically feasible technique.

In various cases, a metric value can be calculated for each of the candidate text strings, wherein the metric incorporates, at least in part, a value of the number of text strings included in each cluster of distinct text strings. It will be appreciated that the metric value does not require the top candidate text string to be the text string associated with the largest cluster, but in most cases, the function for computing the metric value will weigh the size of the cluster heavily when calculating the metric value.

In some embodiments, the text strings in the set of text strings are normalized prior to processing with the clustering algorithm. A normalization procedure analyzes each text string and replaces words that occur infrequently in the documentation corpus with tokens. In addition, the normalization procedure can replace words that occur in the title of the corresponding symbol.

For example, infrequently occurring words can be removed by analyzing the documentation corpus to generate a dictionary of words in the documentation corpus that indicates a frequency of occurrence of each word. Words having a frequency of occurrence below a threshold value can be replaced with a token. In some cases, phrases can be analyzed in addition to individual words. Phrases can be identified based on, at least in part, a part-of-speech analysis of the text, n-gram analysis, and the like. For example, prepositional phrases can be replaced by a token when the object within the prepositional phrase is associated with a frequency of occurrence below a threshold value.

In some embodiments, the normalization process can replace words associated with the title of the documented symbol with a special title token, <title>. These title tokens indicate that the word should be replaced with a word associated with the title of the undocumented symbol. For example, for the "underestimatedCount" symbol, any words in the text string matching either "underestimated" or "Count" can be replaced with a title token.

In some embodiments, title tokens are automatically replaced with a corresponding substitute word or phrase. For example, a multi-pass generated phrase list is utilized to make simple corrections, such as replacing "max" with "maximum" or "first" with "last". This phrase list can replace words with similar meaning to a word in the title of the documented symbol with a corresponding word in the title of the undocumented symbol. In some embodiments, a part-of-speech tagged stack can be utilized to make additional translations between the text string for the documented symbol and the text string for the undocumented symbol. In another example, the title token "min" can be replaced with the candidate title token "max". In turn, "max" can be expanded to "maximum" (as described above).

It will be appreciated that various techniques or algorithms can be implemented to normalize the text strings for documented symbols. In some embodiments, a machine learning algorithm can be configured to implement the normalization task. The machine learning algorithm can be trained using feedback associated with the editing of the text string b a user in a client application. For example, words that have not been replaced with a token, which are subsequently deleted or replaced by a user during editing, can be utilized to update the machine learning algorithm to ideally replace such words with a token in the future.

In some cases, even though a title token replaces a word or words in the text string, the undocumented symbol might not include any corresponding words in the title of the undocumented symbol to make an automatic replacement in the text string. In such cases, the title token can be left in the text string and a user can be prompted to enter a word or phrase to replace the title token at a later time.

In some embodiments, portions of a text string that are replaced with a token during the normalization process can be associated with the token as substitute text strings. One or more substitute text strings associated with a token can be aggregated into a data structure during the normalization process, and can be included in the output as suggested alternatives for replacing the token in the final version of the abstract stored in the document for the undocumented symbol.

FIG. 11 illustrates a list of normalized candidate text strings that have been reduced via the clustering algorithm, in accordance with some embodiments. As depicted in FIG. 11, two distinct text strings, after normalization, are found to match and, as a result, have been grouped into the same cluster by the clustering algorithm. Consequently, the normalized candidate text strings include: (1) "[t]he number of elements in the <token>" as text string 1102; and (2) "[a] value less than or equal to the number of elements in the <token>" as text string 1104.

In some embodiments, the normalized candidate text strings are ranked based on a similarity to a target symbol and a frequency of occurrence that the normalized text string occurs in the list of candidate text strings. As is clear based on FIG. 10 and FIG. 11, a particular text string may occur more frequently after normalization than prior to normalization, which can affect the output of the algorithm when selecting the top candidate text string.

As previously noted herein, the clustering algorithm can refer to any of a number of different machine learning techniques for grouping data points. In some embodiments, the clustering algorithm is provided a vector that represents each text string, the values in the vector being determined using TFIDF statistics. The clustering algorithm compares the cosine distance of the vectors to group similar text strings into clusters according to the techniques described above.

FIGS. 12A-12D illustrate a client application 1200 that facilitates the editing of documents, in accordance with some embodiments. The client application 1200 can be executed on a client device, such as client device 380, in communication with one or more server devices, such as a front end of the CMS 300. The client application 1200 receives the output from one or more server devices. The client application 1200 can create a document for the undocumented symbol in an editing environment. In some embodiments, the editing environment has a different appearance than the documents displayed to a user in, e.g., a portable document format or a markup language document displayed on a web page. For example, the editing environment can be a secure environment that enables technical writers to edit the text string that will appear in the document as the abstract for the documented symbol, whereas the document generated for the documented symbol can be a file that includes markup language to be viewed in a browser application and may not be editable natively in the browser application.

In some embodiments, the client application 1200 is a web-based application that lets the user edit the text string in a browser application. In other embodiments, the client application 1200 is integrated into an IDE utilized by software developers to generate source code for the software framework(s).

Figure 12A:
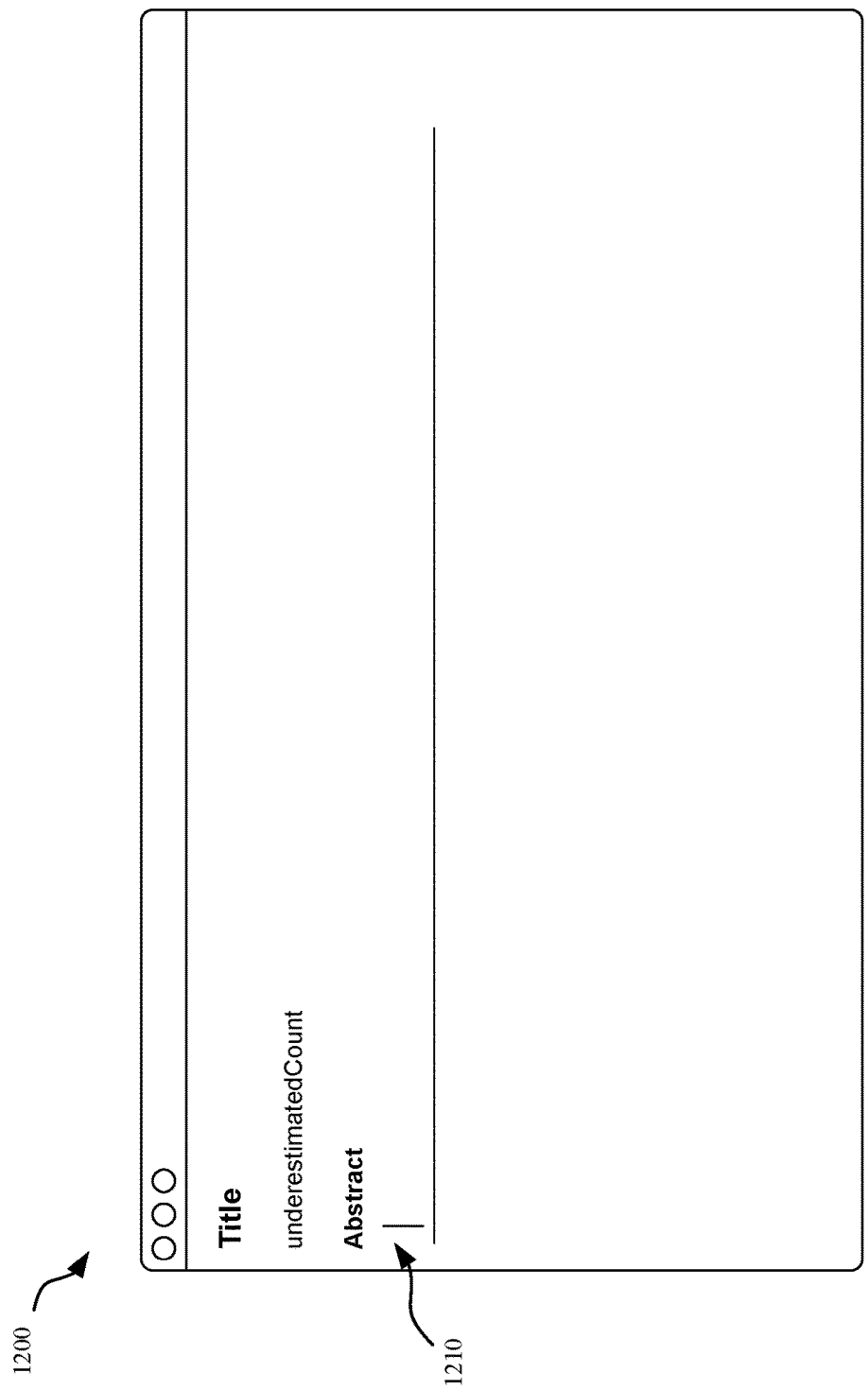
FIGS. 12A-12D illustrate a client application that facilitates editing of documents, in accordance with some embodiments.
Figure 12B:
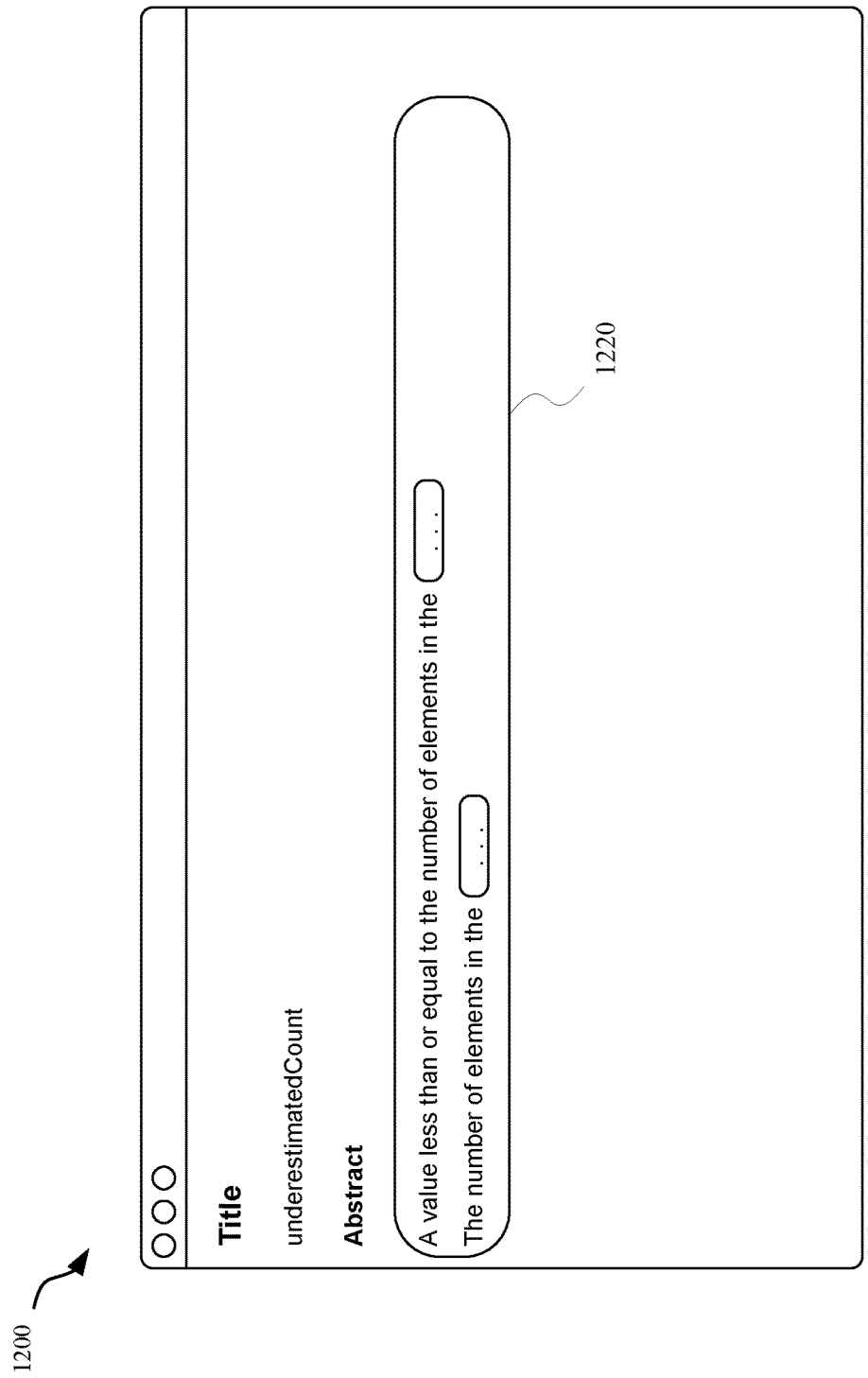

As depicted in FIG. 12A, the user may be presented with information related to the undocumented symbol in the client application 1200. For example, a title of the symbol is displayed near the top of the application window, and a cursor 1210 can be placed near a line where the abstract will be edited. While the line appears blank, the client application 1200 can read one or more text lines that have been provided for the abstract in the output from the one or more servers. The cursor 1210, while allowing the user to enter text similar to a normal document editing application, can also function as a user interface element 1220 that displays one or more suggested text strings to use for the abstract of the undocumented symbol, as depicted in FIG. 12B. In some embodiments, by clicking on or otherwise activating the cursor

1210, a user interface element 1220 such as a drop down menu can appear that displays one or more suggested text strings to be selected by the user. As shown in FIG. 12B, the suggested text strings can represent the normalized candidate text strings as reduced by the clustering algorithm. Furthermore, each of the suggested text strings can include a visual representation for a token that indicates that additional text may need to be added or otherwise inserted into the particular suggested text string. In some embodiments, the visual representation is a graphic that includes an ellipsis, although any other type of visual representation can be utilized instead of the representation shown in FIG. 12B.

Figure 12C:
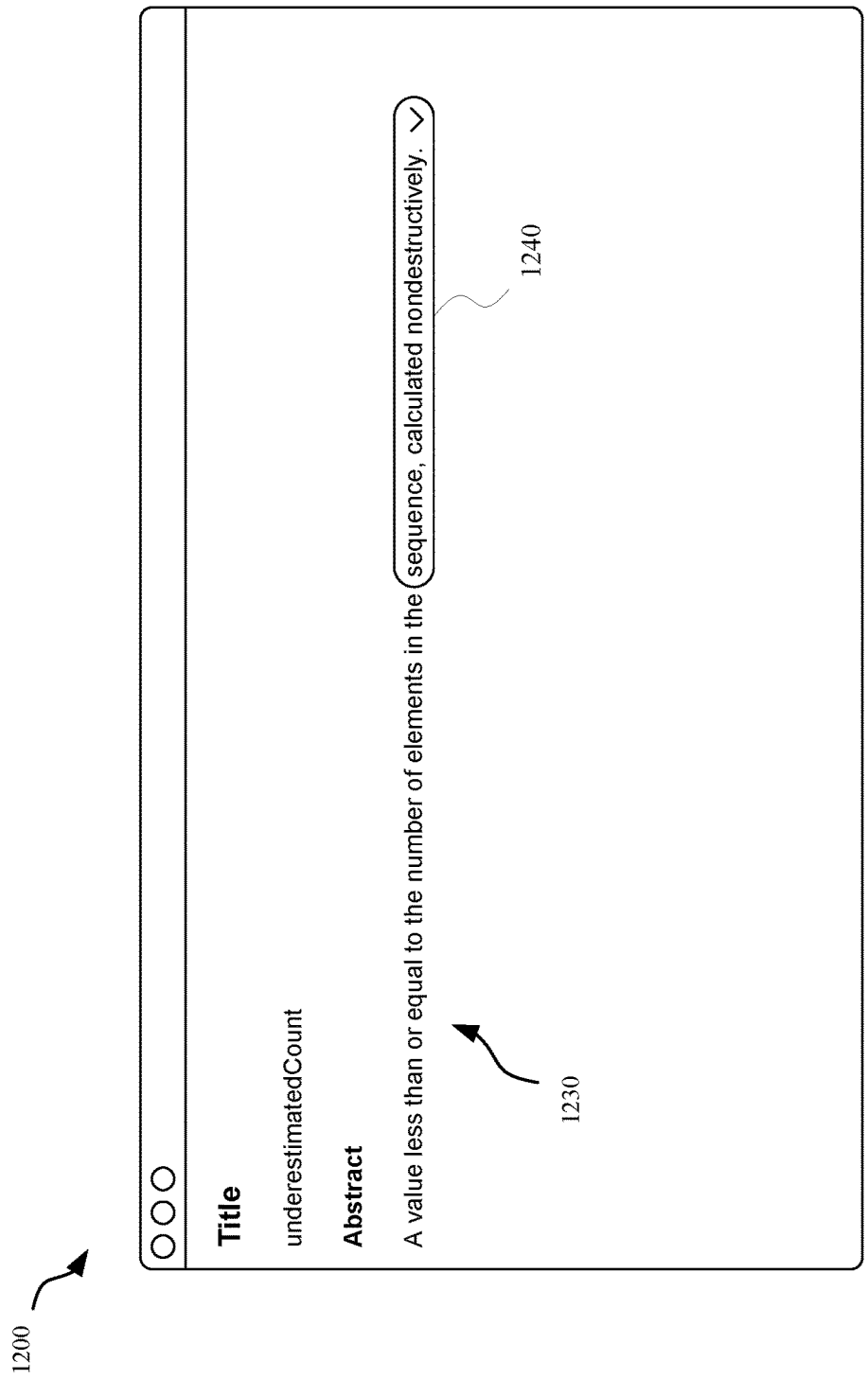
Figure 12D:
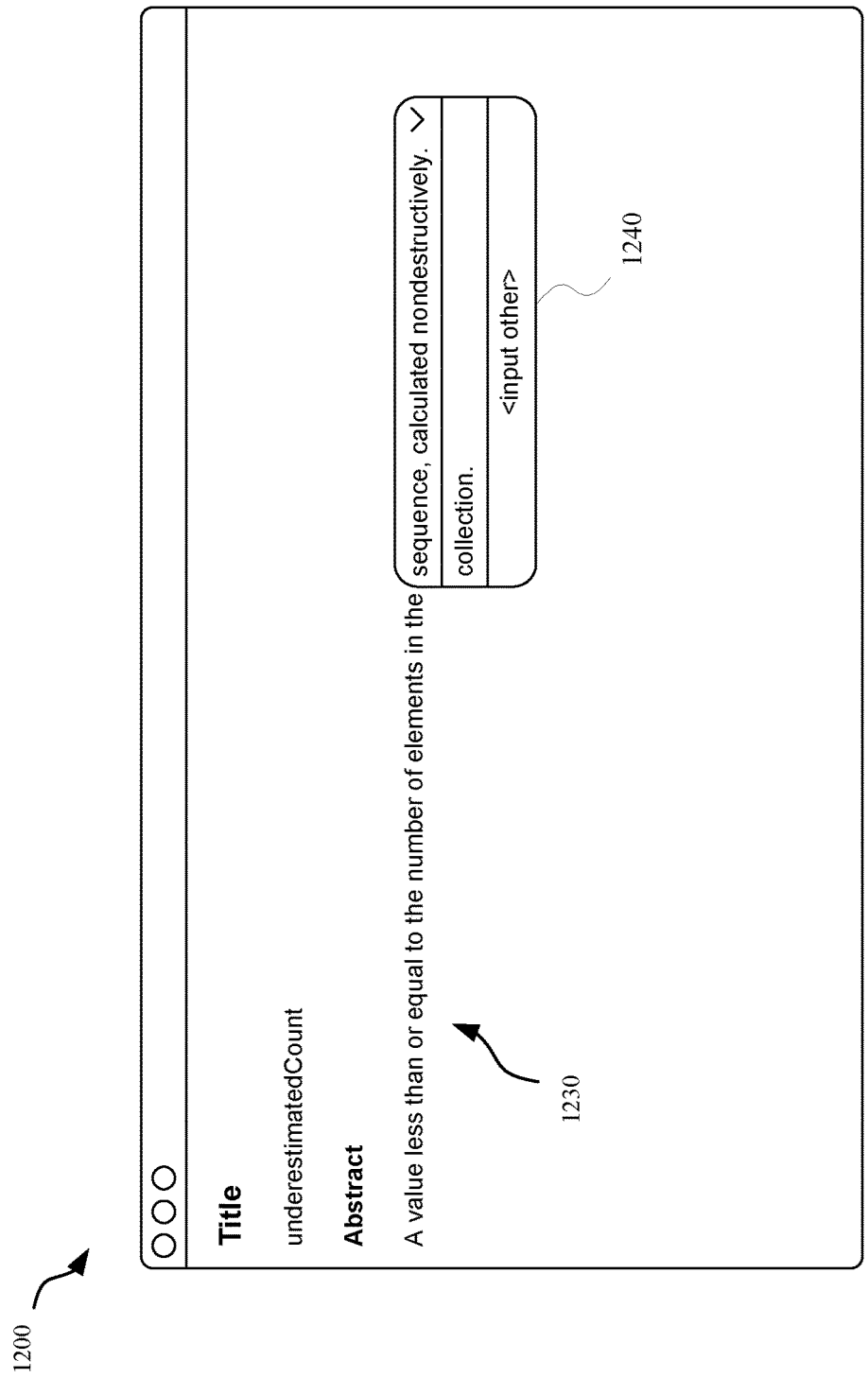

Once a particular suggested text string has been selected, the text string 1230 is displayed on the line in place of the cursor 1210, as depicted in FIG. 12C. In some embodiments, a user interface element 1240 replaces the visual representation of the token, and a substitute text string is displayed in the user interface element 1240 as an option that the user can select to replace the token in the text string. The user interface element 1240 can also enable the user to select a different suggested text string. For example, as depicted in FIG. 12D, the user interface element 1240, when selected or otherwise activated, can display two or more of the substitute text strings received from the one or more server devices and provide the user with an option to select a particular substitute text string to replace the token. As additionally shown in FIG. 12D, the user interface element 1240 can also include an option to enable the user to override the available selections—i.e., by selecting the "<input other>" option—and manually input a text string as he or she sees fit.

Figure 13:
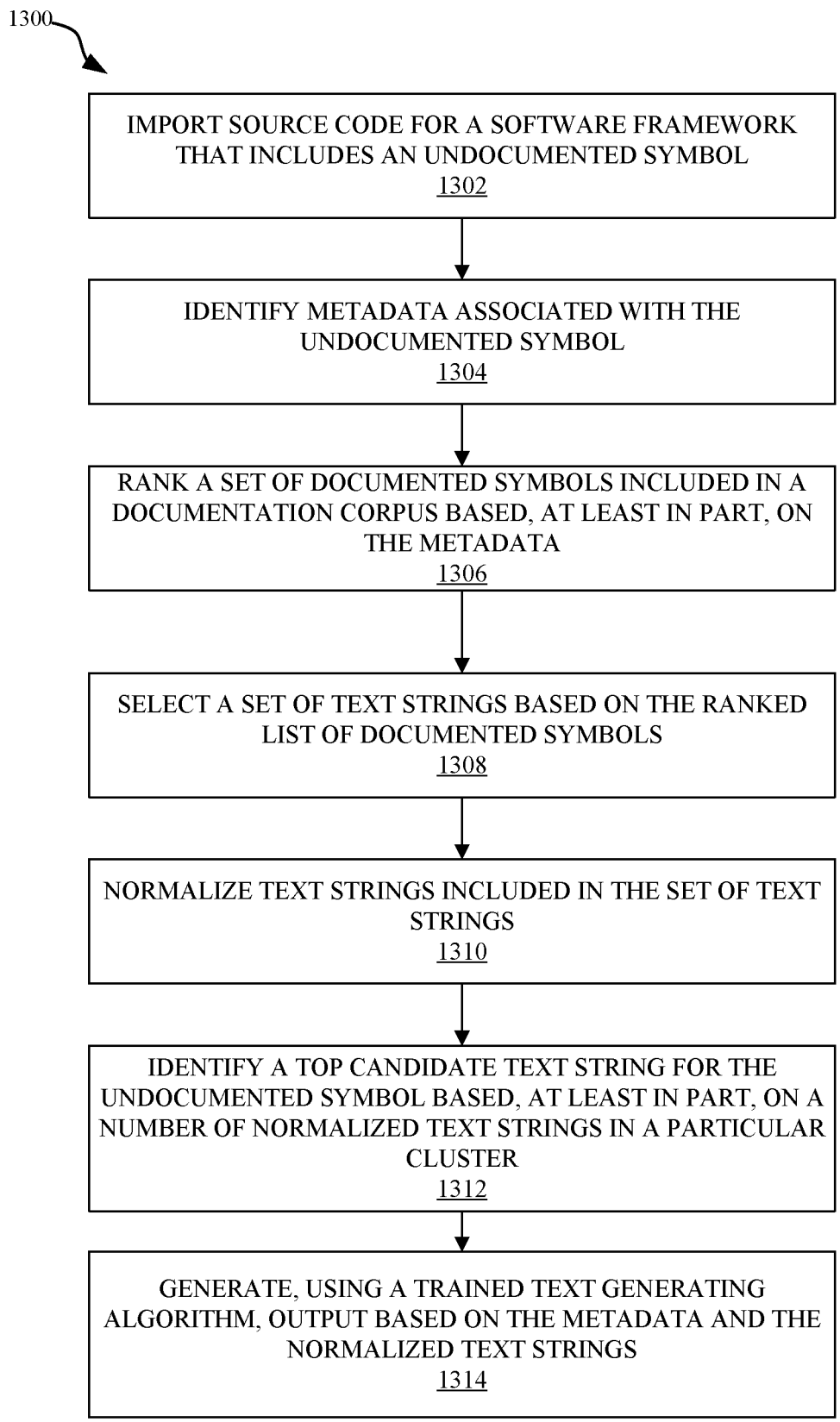
FIG. 13 illustrates a method for generating documentation for an undocumented symbol, in accordance with some embodiments.

FIG. 13 illustrates a method 1300 for generating documentation for an undocumented symbol, in accordance with some embodiments. The method 1300 can be performed, at least in part, by one or more servers configured to execute instructions that cause a processor to implement the steps of the method. Although the steps are described as being performed by software, in other embodiments, any individual step can be performed by hardware, software, or a combination of hardware and software.

At 1302, source code for a software framework is imported, the source code including an undocumented symbol. The source code can be imported into a CMS 300 and parsed to identify at least one symbol that does not have a corresponding document in a documentation corpus for the software framework or a set of related software frameworks.

At 1304, metadata associated with the undocumented symbol is identified. In some embodiments, the metadata is generated automatically by the CMS 300 when the source code is imported. In other embodiments, the metadata is stored in a memory and retrieved using the undocumented symbol. For example, metadata corresponding to each of the symbols in the source code can be stored in a database or a key-value data store, the metadata can be referenced using the undocumented symbol as a key.

At 1306, a set of documented symbols included in a documentation corpus are ranked based, at least in part, on the metadata. In some embodiments, the metadata is provided as a query to a machine learning algorithm, such as a retrieval algorithm, that generates a ranking of the documented symbols. The output of the machine learning algorithm can be a ranked list of documented symbols referred to as candidate symbols.

At 1308, a set of text strings are selected based on the ranked list of documented symbols. Each candidate symbol can be associated with a corresponding document in the documentation corpus. A number of the documented symbols at the top of the ranked list can be selected as candidate symbols. A text string included in the document for each candidate symbol can be read from the document for the candidate symbol and included in the set of text strings for the undocumented symbol.

At 1310, each text string in the set of text strings is normalized. The normalization procedure can replace one or more words in the text string with tokens. Title tokens can replace words that match or are associated with words included in the title of the corresponding documented symbol. In some cases, words from the title of the undocumented symbol can be used to automatically replace title tokens in the normalized text string. Other tokens can represent portions of the text string that are not frequently occurring within the documentation corpus. In some embodiments, a machine learning algorithm can be utilized to normalize the text strings, where the machine learning algorithms translates a particular string into a modified string that conforms to a style or set of standards associated with the documentation corpus. In some embodiments, the translation includes utilizing a part-of-speech analysis to identify words or phrases inserted into the text string to replace a token.

At 1312, a top candidate text string is identified for the undocumented symbol based, at least in part, on a number of normalized text strings in a particular cluster. In some embodiments, the normalized text strings are grouped according to a clustering algorithm, such as K-means clustering. The number of normalized text strings included in each cluster is utilized to calculate a metric value corresponding to each of the normalized text strings in the set of text strings. For example, the metric value can combine a similarity score between a documented symbol and the undocumented symbol with a cluster score that indicates a relative size of a cluster for each of the text strings. It will be appreciated that any reasonable metric can be utilized to identify the top candidate text string from a set of text strings that are normalized.

At 1314, output may be generated using text generating algorithm that is trained based on the metadata of documented symbols and normalized text strings of documentation of the documented symbols. The text generating algorithm is trained using an existing corpus of symbol documentation including metadata and text strings describing the symbols. In some embodiments, the text strings describing the symbols may be normalized and the normalized text strings may be used to train the text generating algorithm. In some embodiments, the text strings describing the symbols may not be normalized and the text strings may be used to train the text generating algorithm. The text generating algorithm may generate output based on learned associations between the metadata and documented symbols.

In some embodiments, the output of the retrieval algorithm may be used to judge the output of the text generating algorithm. For example, the top candidate text string may be compared to the output generated by the text generating algorithm. If the top candidate text string and the output generated by the text generating algorithm satisfy a threshold matching metric, then the output generated by the text generating algorithm may be used. If the threshold matching metric is not satisfied, then the retrieval algorithm and/or the text generating algorithm may be further trained to increase accuracy and consistency.

Figure 14:
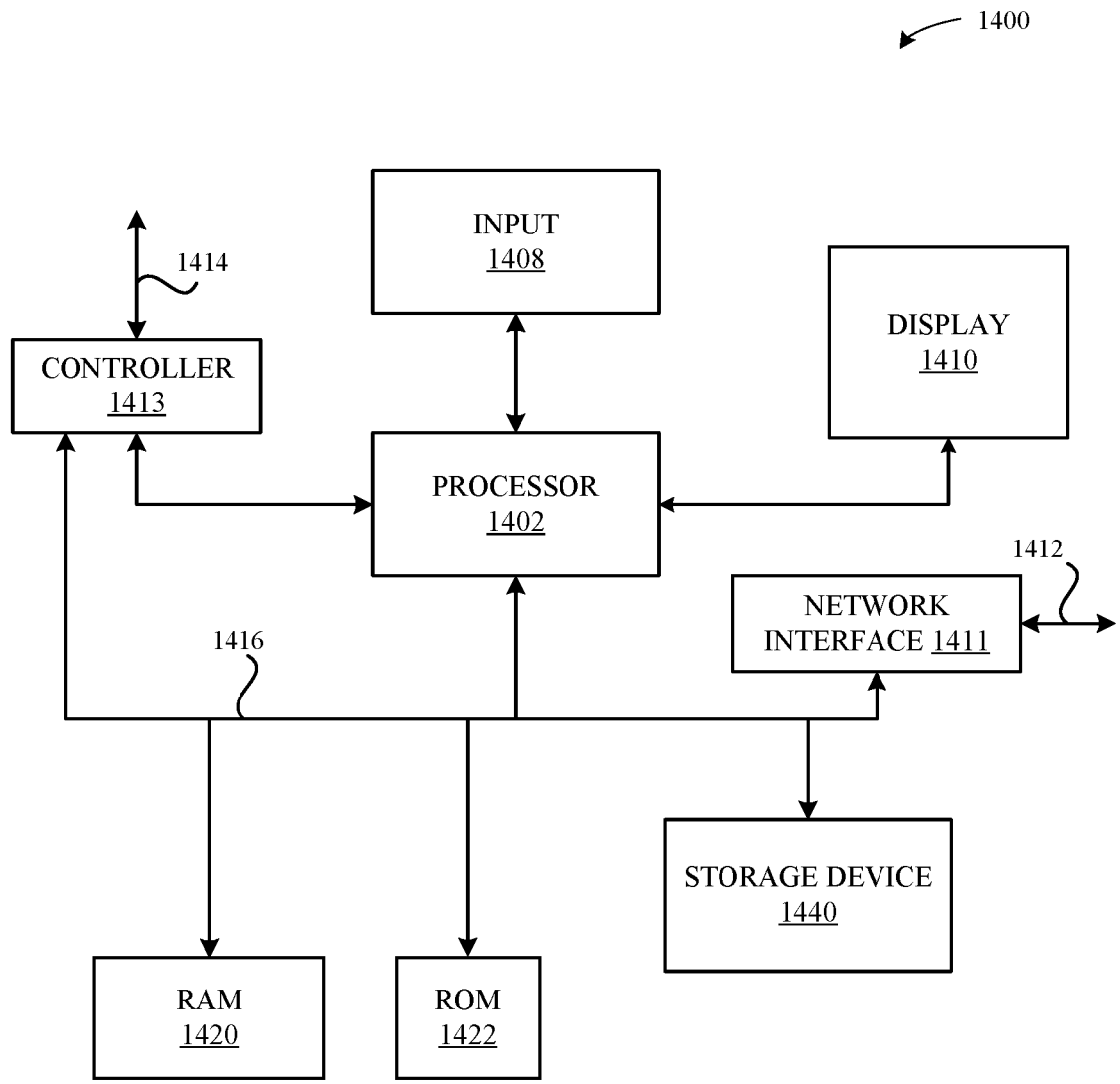
FIG. 14 illustrates a detailed view of an exemplary computing device that can be used to implement the various apparatus and/or methods described herein, in accordance with some embodiments.

FIG. 14 illustrates a detailed view of an exemplary computing device 1400 that can be used to implement the various apparatus and/or methods described herein, in accordance with some embodiments. In particular, the detailed view illustrates various components that can be included in the computing devices illustrated in FIGS. 1 to 13 and/or described herein. For example, one or more of the server devices(s) 350, client device(s) 380, server devices included in the CMS 300, or any other device including any network devices and/or consumer electronics can include the components of computing device 1400.

As shown in FIG. 14, the computing device 1400 can include a processor 1402 that represents a microprocessor or controller for controlling the overall operation of computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, etc. Still further, the computing device 1400 can include a display 1410 (screen display) that can be controlled by the processor 1402 to present visual information to the user. A data bus 1416 can facilitate data transfer between at least a storage device 1440, the processor 1402, and a controller 1413. The controller 1413 can be used to interface with and control different equipment through an equipment control bus 1414. The computing device 1400 can also include a network/bus interface 1411 that couples to a data link 1412. In the case of a wireless connection, the network/bus interface 1411 can include a wireless transceiver.

The computing device 1400 also include a storage device 1440, which can comprise a single disk or a plurality of disks (e.g., hard drives), and includes a storage management module that manages one or more partitions within the storage device 1440. In some embodiments, storage device 1440 can include flash memory, semiconductor (solid state) memory or the like. The computing device 1400 can also include a Random Access Memory (RAM) 1420 and a Read-Only Memory (ROM) 1422. The ROM 1422 can store programs, utilities or processes to be executed in a non-volatile manner. The RAM 1420 can provide volatile data storage, and stores instructions related to the operation of the computing device 1400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for generating documentation for undocumented symbols included in source code, the method comprising
    by computing device that includes a processor configured to execute instructions stored on an associated memory that cause the computing device to perform steps that include:
        identifying metadata for an undocumented symbol corresponding to one of a variable and a function, wherein:
            the metadata includes at least one field associated with at least one value corresponding to the undocumented symbol,
            the at least one value associated with the at least one field of metadata corresponding to a variable is different from the at least one value associated with the at least one field of metadata corresponding to a function, and
            the at least one field of the metadata corresponding to the variable is the same as the at least one field of the metadata corresponding to the function;
        processing a set of documented symbols included in a corpus of documented symbols, wherein the set of documented symbols comprise documented symbol metadata and text strings describing the set of documented symbols; and
        generating, for display at a client device, an output for the undocumented symbol based on a text string associated with at least one documented symbol in the set of documented symbols and the metadata for the undocumented symbol.

2. The method of claim 1, wherein processing the set of documented symbols comprises identifying the set of documented symbols by comparing documented symbol metadata for the set of documented symbols with the metadata for the undocumented symbol.

3. The method of claim 1, wherein processing the set of documented symbols comprises comparing documented symbol metadata for the set of documented symbols with the metadata for the undocumented symbol by processing the metadata for the undocumented symbol with a text generating algorithm trained to identify an association between the documented symbol metadata and the text strings describing the set of documented symbols.

4. The method of claim 1, wherein the text string is modified to replace at least a portion of the text string with a token.

5. The method of claim 4, wherein the token is replaced with information included in the metadata.

6. The method of claim 1, wherein the at least one field associated with at least one value corresponding to the undocumented symbol of the metadata includes one or more of:
    a first field that specifies a signature of the undocumented symbol;
    a second field that specifies a name of the undocumented symbol;
    a third field that includes a list of words included in the name of the undocumented symbol in accordance with a camel case format;
    a fourth field that specifies a category for the undocumented symbol;

a fifth field that specifies a category for a parent programming construct associated with the undocumented symbol;

a sixth field that includes a list of parameters associated with the undocumented symbol;

a seventh field that includes a list of types associated with each of the parameters associated with the undocumented symbol;

an eight field that specifies a type associated with the undocumented symbol;

a ninth field that specifies a software framework associated with the undocumented symbol;

or a tenth field that specifies source code in which the undocumented symbol is used.

7. The method of claim 6, wherein the metadata is generated automatically when source code including the undocumented symbol is imported into a content management system (CMS).

8. The method of claim 1, further comprising:
receiving a set of text strings corresponding to documented symbols; and
for each text string in the set of text strings:
analyzing the text string to generate term frequency-inverse document frequency (TFIDF) statistics, and
replacing at least a portion of the text string with one or more tokens based on the TFIDF statistics.

9. The method of claim 8, wherein the one or more tokens includes a title token for a term included in information contained in metadata for a documented symbol.

10. The method of claim 1, further comprising transmitting, to the client device for display, a structured document including the output, wherein client device is remotely located from the computing device.

11. A system for generating documentation for a software framework, the system comprising:
at least one server that includes a processor and a memory storing instructions that, when
executed by the processor, cause the at least one server to:
import source code for the software framework into a content management system (CMS),
parse the source code to identify a declaration for an undocumented symbol in the source code, the undocumented symbol corresponding to one of a variable and a function,
generate metadata for the undocumented symbol, wherein:
the metadata includes at least one field associated with at least one value corresponding to the undocumented symbol,
the at least one value associated with the at least one field of metadata corresponding to a variable is different from the at least one value associated with the at least one field of metadata corresponding to a function, and
the at least one field of the metadata corresponding to the variable is the same as the at least one field of the metadata corresponding to the function; and
generate, for display at a client device, a text string for the undocumented symbol based on the metadata for the undocumented symbol and a text string associated with at least one documented symbol in a set of documented symbols.

12. The system of claim 11, wherein the at least one server implements a machine learning algorithm that identifies the set of documented symbols based on the metadata.

13. The system of claim 11, wherein the at least one server is configured to replace a token in the text string associated with the at least one documented symbol with information included in the metadata.

14. The system of claim 13, wherein:
the at least one server trains a machine learning algorithm using metadata of the set of documented symbols and text strings of the set of documented symbols, and
implements the machine learning algorithm to generate, using the metadata for the undocumented symbol, the text string for the undocumented symbol based on associations between the metadata of the set of documented symbols and the text strings of the set of documented symbols.

15. The system of claim 11, wherein the at least one server is configured to:
receive a set of text strings corresponding to the set of documented symbols; and
for each text string in the set of text strings:
analyze the text string to generate term frequency-inverse document frequency (TFIDF) statistics, and
replace at least a portion of the text string with one or more tokens based on the TFIDF statistics.

16. The system of claim 15, wherein the one or more tokens includes a title token for a term included in information contained in metadata for a documented symbol.

17. At least one non-transitory computer readable storage medium comprising:
instructions that, when executed by at least one processor included in a server device, cause the server device to automatically generate documentation for a symbol associated with a software framework by carrying out steps that include:
identifying metadata associated with the symbol, wherein:
the metadata includes at least one field associated with at least one value corresponding to the symbol,
the at least one value associated with the at least one field of metadata corresponding to a variable is different from the at least one value associated with the at least one field of metadata corresponding to a function, and
the at least one field of the metadata corresponding to the variable is the same as the at least one field of the metadata corresponding to the function;
processing a set of documented symbols included in a documentation corpus for the software framework; and
generating, for display at a client device, an output for the symbol based on a text string associated with at least one documented symbol in the set of documented symbols and the metadata associated with the symbol.

18. The at least one non-transitory computer readable storage medium of claim 17, wherein the step of processing the set of documented symbols further comprises identifying a set of candidate symbols by processing the metadata associated with the symbol with a retrieval algorithm to select documented symbols having documented symbol metadata that is similar to the metadata associated with the symbol.

19. The at least one non-transitory computer readable storage medium of claim 18, wherein the step of processing the set of documented symbols further comprises:
training a text generation algorithm to correlate associations between metadata of the set of documented symbols and documentation of the documented symbols and to generate output for the symbol based on the metadata associated with the symbol and the associations between the metadata of the set of documented symbols and the documentation of the documented symbols.

20. The at least one non-transitory computer readable storage medium of claim 19, wherein the step of generating the output for the symbol based on the text string associated with the at least one documented symbol in the set of documented symbols further comprises inputting the metadata associated with the symbol into the text generation algorithm that is trained to generate the output for the symbol using the metadata.

\* \* \* \* \*